United States Patent [19]
Otake et al.

[11] Patent Number: 5,708,457
[45] Date of Patent: Jan. 13, 1998

[54] VIDEO DISPLAY APPARATUS AND EXTERNAL STORAGE DEVICE USED THEREIN

[75] Inventors: Masahiro Otake, Kyoto; Toyofumi Takahashi, Tokyo; Satoshi Nishiumi, Kyoto; Kumiko Kitagawa, Tokyo, all of Japan

[73] Assignees: Nintendo Co., Ltd., Kyoto; Ricoh Co., Ltd., Tokyo, both of Japan

[21] Appl. No.: 831,754

[22] Filed: Apr. 1, 1997

Related U.S. Application Data

[63] Continuation of Ser. No. 190,216, Feb. 1, 1994, abandoned, which is a continuation of Ser. No. 749,527, Aug. 26, 1991, abandoned.

[30] Foreign Application Priority Data

Aug. 27, 1990 [JP] Japan ................................. 2-225670

[51] Int. Cl.$^6$ ................................................. G09G 5/00
[52] U.S. Cl. ...................................... 345/114; 345/190
[58] Field of Search ........................... 340/720, 721, 340/724, 723, 725, 734, 745, 750, 799; 273/434, 437, DIG. 28; 345/113, 114, 115, 116, 120, 124, 121, 125, 128, 192, 193, 187, 188

[56] References Cited

U.S. PATENT DOCUMENTS

| | | | |
|---|---|---|---|
| 4,296,476 | 10/1981 | Mayer et al. | 273/28 D |
| 4,561,659 | 12/1985 | Redfield et al. | 273/437 |
| 4,780,710 | 10/1988 | Tatsumi | 345/120 |
| 4,824,106 | 4/1989 | Ueda et al. | 340/723 |
| 4,847,604 | 7/1989 | Doyle | 340/799 |
| 4,874,164 | 10/1989 | Miner et al. | 340/720 |
| 4,905,147 | 2/1990 | Logg | 273/28 D |
| 4,905,168 | 2/1990 | McCarthy et al. | 340/799 |
| 4,947,257 | 8/1990 | Fernandez et al. | 340/734 |
| 5,016,876 | 5/1991 | Loffredo | 273/437 |
| 5,125,671 | 6/1992 | Ueda et al. | 273/434 |

FOREIGN PATENT DOCUMENTS

| | | |
|---|---|---|
| 0160 549 | 11/1985 | European Pat. Off. . |
| 0 230 787 | 8/1987 | European Pat. Off. . |
| 0 357 813 | 3/1990 | European Pat. Off. . |

*Primary Examiner*—Chanh Nguyen
*Attorney, Agent, or Firm*—Nixon & Vanderhye P.C.

[57] ABSTRACT

A video display apparatus includes a video data generator which generates video data of a plurality of still picture and a moving picture (graphic data) in an overlaid manner on the basis of still picture patterns, still picture character codes, moving picture character codes and etc. programmed in an external storage unit in advance. A microprocessor applies, in accordance with priority data for the still pictures and the moving picture and mode data both programmed in the external storage unit in advance, first priority data to the video data of the still picture characters and second priority data to the video data of the moving picture character, respectively. A priority encoder selects a still picture character or a moving picture character having the highest priority on the basis of the first and second priority data, and applies the number of that character to a decoder. The decoder outputs a gate control signal in accordance with the number. In response to the gate control signal, the video data of the character having the highest priority among the respective still picture characters and the moving picture character is outputted from a gate.

22 Claims, 10 Drawing Sheets

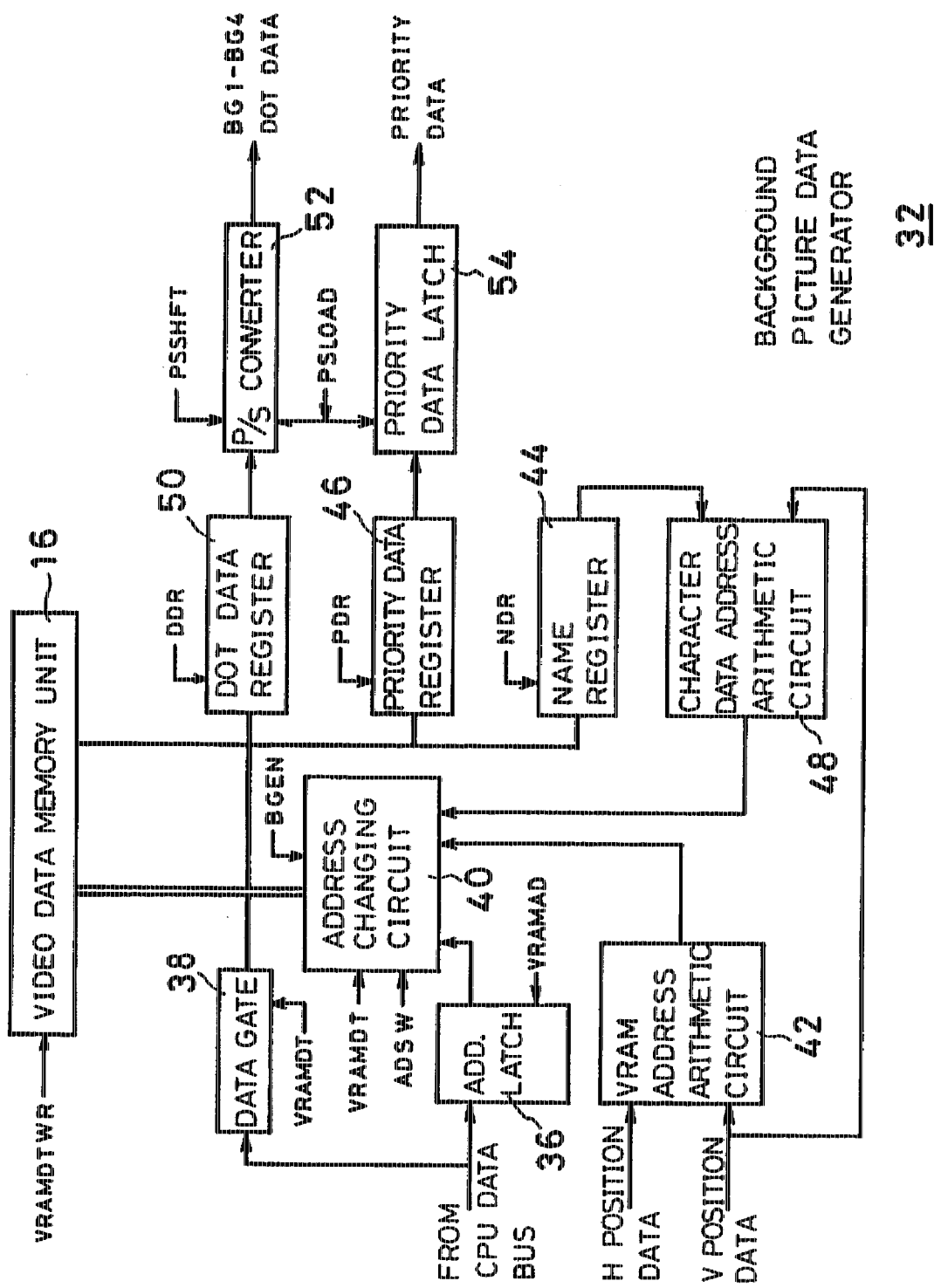

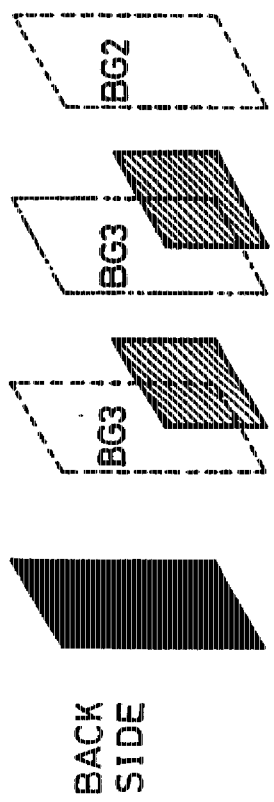

VIDEO DISPLAY APPARATUS AND EXTERNAL STORAGE DEVICE USED THEREIN

This is a continuation of application Ser. No. 08/190,216, filed Feb. 1, 1994, now abandoned, which was in turn a continuation of application Ser. No. 07/749,527, filed Aug. 26, 1991, now abandoned.

CROSS-REFERENCE TO RELATED APPLICATIONS

This application is related to U.S. application Ser. No. 07/651,265, entitled, "Video Processing Apparatus", which was filed on Apr. 10, 1991, now U.S. Pat. No. 5,327,158 issued Jul. 5, 1994, naming Takahishi et al as inventors, which application is hereby expressly incorporated herein by reference. This application is also related to a U.S. patent application Ser. No. 07/749,530 filed concurrently herewith on Aug. 26, 1991 entitled "Direct Memory Access Apparatus In Image Processing System and External Storage Device Used Therein", now U.S. Pat. No. 5,291,189 issued Mar. 1, 1994, naming Otake et al as inventors which application is hereby expressly incorporated herein by reference. This application is also related to an application Ser. No. 07/749,533 filed concurrently herewith on Aug. 26, 1991 entitled "Still Picture Display Apparatus and External Storage Device Used Therein", now U.S. Pat. No. 5,337,069 issued Aug. 9, 1994, naming Otake et al as inventors, which application is hereby expressly incorporated herein by reference.

This application is also related to U.S. application Ser. No. 07/748,938, entitled "TV Game Machine" which was filed on Aug. 19, 1991, now U.S. Pat. No. 5,192,082 issued Mar. 9, 1993, naming Inoue et al as inventors. This latter application discloses an exemplary mechanical design for a video game control deck and associated removable game cartridge, which design may be used to house the electronics described herein. This application is also expressly incorporated herein by reference.

BACKGROUND OF THE INVENTION

1. Field of the invention

The present invention relates to a video display apparatus and an external storage unit used in the video display apparatus. More specifically, the present invention relates to a video display apparatus which displays a plurality of still picture cells (and moving picture) in an overlaid state onto a monitor screen.

2. Description of the Prior Art

For example, Japanese patent publication No. 2-7478 published on Feb. 19, 1990 (corresponding to U.S. Pat. No. 4,824,106) discloses a video display apparatus to be utilized effectively for a television game machine or the like. In the prior art, when a moving picture (object character) and a background or still picture (still picture character) are displayed in overlaid state, in order to determine which is to be displayed at a front side of a monitor screen, priority data denoted by "0" or "1" is applied, and in a multiplexer, a moving picture or a still picture having the priority data "1" is selected to be displayed.

When a plurality of still picture cells are used, the still picture cells can be displayed with the order inverted utilizing the prior art as above described. In this method, however, only each still picture cell as a whole can be inverted. On the other hand, in order to increase variety of a game or to improve visual effect, a request occurs to display a plurality of still picture cells inverted partially, for example, per each character.

In order to respond to such a request, in a case of utilizing the prior art as above described, still picture video data may be rewritten during a vertical (V) blanking period.

However, the still picture video data to be rewritten are video data of a whole monitor screen of all of the still picture cells. Particularly, when the still picture cells are high in number, the amount of the data to be rewritten becomes enormous. Consequently, in the prior art, as a practical matter, a plurality of still picture cells cannot be displayed partially by changing the priority.

SUMMARY OF THE INVENTION

Therefore, a principal object of the present invention is to provide a video display apparatus in which portions of a plurality of still picture cells can be displayed with the order inverted when the still picture cells are overlaid.

Another object of the present invention is to provide an external storage unit which is effectively used in the above described video display apparatus.

In brief, a video display apparatus in accordance with the present invention displays a plurality of still picture cells in an overlaid state, the video display apparatus comprising still picture video data generating means for generating video data of a still picture character to be displayed regarding each of the plurality of still picture cells, first priority data applying means for applying first priority data to the video data of the still picture character from the still picture video data generating means, selecting means for determining the priority based on the first priority data applied to each still picture character and for selectively outputting the video data of one still picture character of a still picture having highest priority among the plurality of still picture characters, and display means for displaying the still picture character outputted selectively by the selecting means.

An external storage unit in accordance with the present invention is used in association with a video display apparatus which displays a plurality of still picture cells in an overlaid state on a monitor screen on the basis of video data of still picture characters generated by a still picture video data generator. The external storage unit comprises still picture character code generating means for generating a still picture character code that designates a still picture character to be displayed, the still picture character video data generator generating the video data on the basis of the still picture character code; and priority data storing means for storing first priority data that designates priority of each still picture character. The video display apparatus includes selecting means for determining priority of each still picture character on the basis of the first priority data applied thereto and for selectively outputting the video data of one still picture character having the highest priority of the still picture character among the plurality of still picture cells.

The still picture video data generating means generates, for example, video data (e.g., graphic data or dot data) of a still picture character of each still picture cell based on still picture pattern data and character data in accordance with display positions on a monitor. A microprocessor or CPU applies the first priority data to the video data of each still picture character in accordance with a program. The selecting means includes, for example, a priority encoder and a decoder, and the priority encoder selects a still picture character having highest priority and applies the number of that still picture character to the decoder. The decoder decodes the number, and outputs a gate control signal. Consequently, in response to the gate control signal outputted from the decoder, among the video data of respective still picture characters inputted to the selecting means, the one still picture character having the highest priority is outputted from the gate.

According to the present invention, since the first priority data is applied per each character of the still picture cells, and based on this, the selecting means selectively outputs the video data of the still picture character of the one still picture cell having the highest priority, the still picture cells can be easily displayed with the order inverted per each character.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 3 is a block diagram showing a background picture data generator of the embodiment in FIG. 1;

FIGS. 11A–11D are illustrative views showing different display states in the embodiment respectively, where FIG. 11A shows mode 0, FIG. 11B shows mode 1, FIG. 11C shows mode 2, and FIG. 11D shows mode 3.

DETAILED DESCRIPTION OF THE PREFERRED EMBODIMENTS

Figure 1:
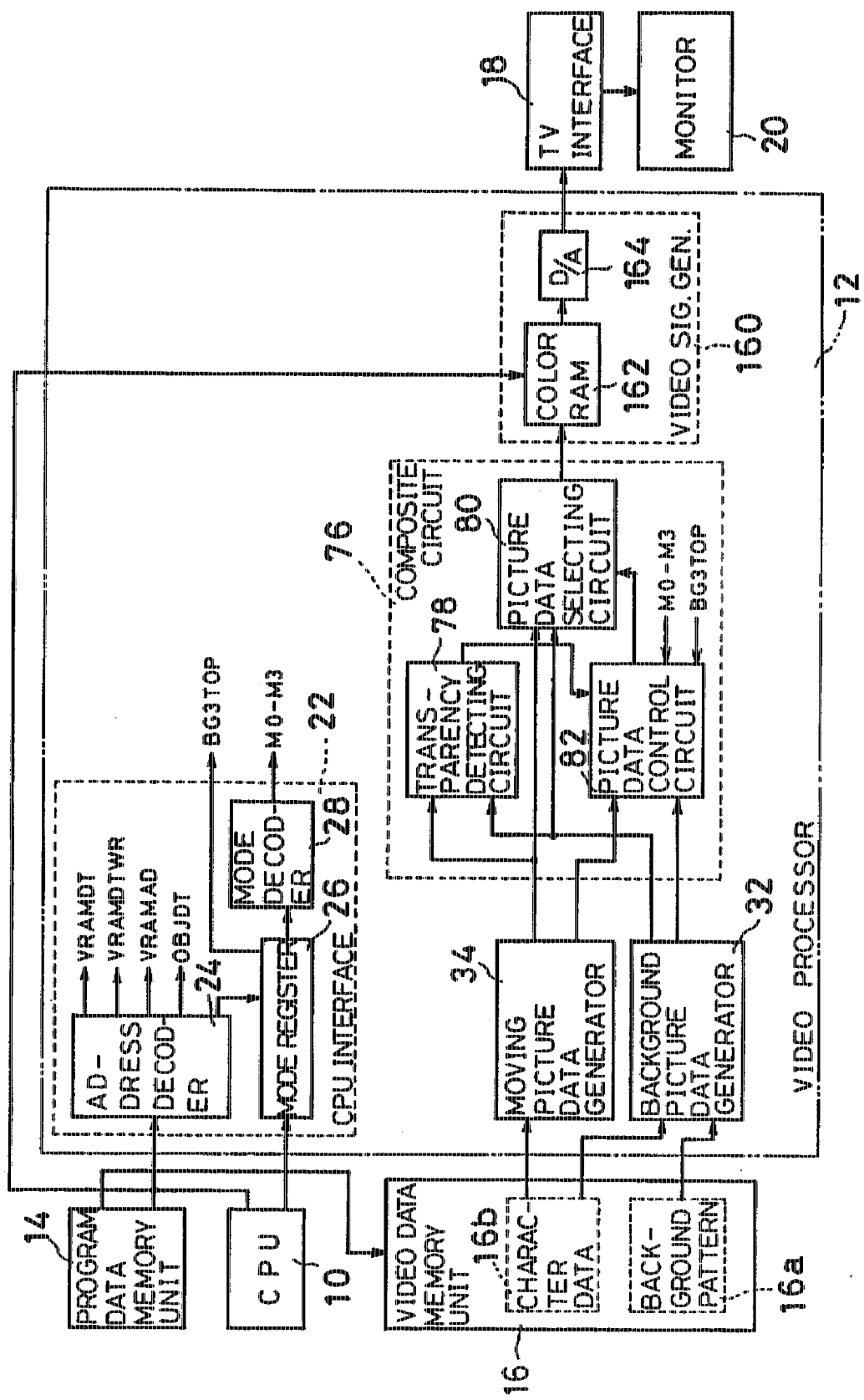
FIG. 1 is a block diagram showing an embodiment in accordance with the present invention.

Referring to FIG. 1, a CPU 10 controls overall operation of a picture display apparatus such as a video processor 12 in accordance with program data from a program data memory unit 14 included in a memory cartridge of detachable type, for example. As the CPU 10, for example, a microprocessor of 16 bits is used.

The video processor 12 reads graphic data (dot data) from a video data memory unit 16 in accordance with commands based on the program from the program data memory unit 14 and thus the microprocessor or CPU 10, and applies read data to a TV interface 18. The video data memory unit 16 comprises a SRAM (Static Random Access Memory) of 64K bytes for example, and includes a background pattern area 16a and a character data area 16b. The background pattern area 16a and the character data area 16b are in one SRAM as above described, because the operation speed is rapid and size of the memory area can be arbitrarily set with respect to the character (object) and background pattern.

The TV interface 18 converts the graphic data from the video processor 12 into an RGB signal or TV signal, and supplies the signal to a monitor 20. Consequently, on a screen of the monitor 20, with progress of the program set in advance to the program data memory unit 14, a moving picture (object) of a video game and a still picture (background picture) are displayed.

The video processor 12 includes a CPU interface 22 which includes an address decoder 24, a mode register 26 and a mode decoder 28. The address decoder 24 decodes address data outputted from the CPU 10 to an address bus and applies a latch signal to the mode register 26, and outputs other necessary timing signals VRAMDT, VRAMDTWR, VRAMAD and OBJDT. The mode register 26 latches mode data outputted from the CPU 10 to a data bus in response to the latch signal from the address decoder 24, and supplies latched data to the mode decoder 28. In addition, such mode data is programmed in the program data memory unit 14 in advance, as data of one byte. The mode data is normally programmed at the beginning of the program, but a plurality of mode data may be programmed as necessary. Then, the mode data is read by the CPU 10 to be transferred to the mode register 26. The mode decoder 28 decodes the mode data from the mode register 26, and outputs a mode signal M0–M3 representing each mode described later referring to FIGS. 11A–11D. In addition, from the mode register 26, a signal BG3TOP is outputted so as to indicate whether or not a specific background picture cell (in this embodiment, a third background picture cell BG3 as later described) is to be displayed at a nearest side on the screen of the monitor 20. Additionally, the signal BG3TOP, the most significant bit of the mode register 26 is outputted as it is.

Figure 2:
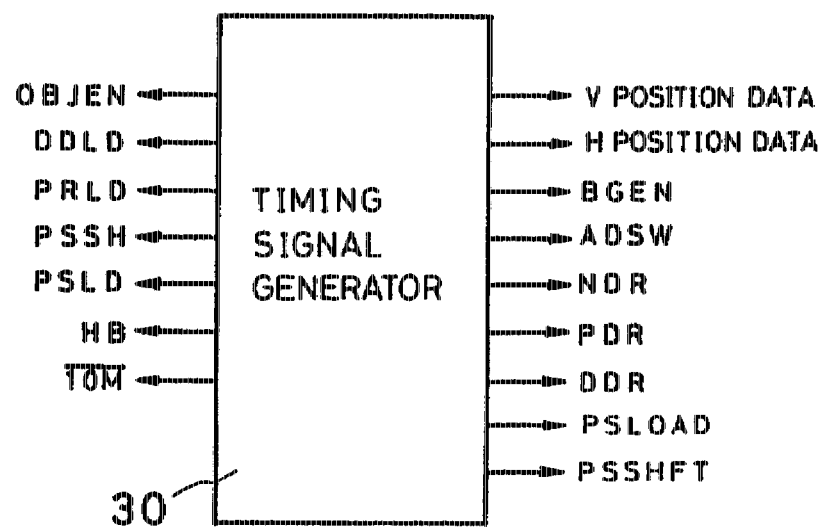
FIG. 2 is a block diagram showing a timing signal generator of the embodiment in FIG. 1.

The video processor 12 is provided with a timing signal generator 30 as shown in FIG. 2. The timing signal generator 30 receives a base clock of 21.47727 MHz for example, and processes the base clock, for example, by a counter, a decoder, a logic circuit or the like thereby prepares necessary timing signals and supplies the same to respective circuits included in the video processor 12. For example, if the base clock is subjected to frequency dividing at ½, a timing signal/10M (in the specification, a symbol "/" means inversion) can be obtained. The signal/10M is further subjected to frequency dividing at ½, and a resulting signal corresponds to a display period of one dot (pixel) on the screen of the monitor 20 (FIG. 1). So by counting this signal, V position data and H position data respectively indicating a vertical position (V position) and a horizontal position (H position) on the screen of the monitor 20 can be obtained.

A timing signal BGEN is applied to a background picture data generator 32 (FIG. 3) as described later so as to specify a timing when an address is to be applied to the video data memory unit 16, and a timing signal OBJEN is applied to a moving picture data generator 34 as described later so as to specify a timing when an address is to be applied to the video data memory unit 16. A timing signal ADSW is a signal to command address changing in the background picture data generator 32. A timing signal NDR functions as a latch signal for a name register 44 (FIG. 3) as described later. A timing signal PDR functions as a latch signal for a priority data register 46 (FIG. 3) as described later. A timing signal DDR functions as a latch signal for a dot data register 50 (FIG. 3) as described later. A timing signal PSLOAD is a latch signal which is applied to a P/S converter 52 and a priority data latch 54 (FIG. 3) as described later. A timing signal PSSHFT is applied to the P/S converter 52 (FIG. 3), and functions as a conversion command signal of the P/S converter 52.

A timing signal DDLD functions as a latch signal for a dot data register 70 (FIG. 5) as described later. A timing signal PRLD functions as a latch signal for a priority data register 66 (FIG. 5) as described later. A timing signal PSSH is applied to a line buffer address circuit 64 and a P/S converter 72 (FIG. 5) as described later, and the P/S converter 72, receiving the timing signal PSSH, shifts the character data, and in synchronization with the P/S converter 72 shifting the data, the line buffer address circuit 64 increments an address value of a line buffer 74 (FIG. 5) as described later. A timing signal PSLD functions as a latch signal for the P/S converter 72. A timing signal HB is a signal representing a horizontal blanking period, and is applied to the moving picture data generator 32 shown in FIG. 5 so that the moving picture data is rewritten during the horizontal blanking period.

Figure 4:
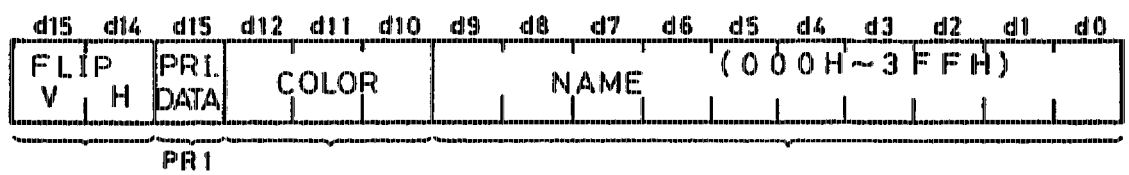
FIG. 4 is an illustrative view showing an example of a data format of background pattern data.

The background picture data generator 32 shown in FIG. 1 is shown in FIG. 3 in detail. In the background pattern area 16a of the video data memory unit 16, background (still picture) pattern data shown in FIG. 4 are stored per each background (still picture) character. More specifically, the background character data representative of one character includes name data (character code) of ten(10) bits, color data of three(3) bits, priority data of one(1) bit and flip data of two(2) bits. Such background pattern data, in response to the signal VRAMDTWR from the address decoder 24 (FIG. 1), is written from the program data memory unit 14 into the video data memory unit 16 by the CPU 10 through the background picture data generator 32.

At an initialized state or during the vertical blanking period, the CPU 10 (FIG. 1) outputs a VRAM address value to the data bus corresponding to a position of the character on the screen in accordance with the program incorporated in the program data memory unit 14, and outputs a port address to the address bus corresponding to the address latch 36. The address decoder 24, receiving the port address, outputs the latch signal VRAMAD to the address latch 36. The address latch 36, receiving the signal VRAMAD, latches the address value outputted from the CPU 10 at that time. Thereafter, the CPU 10 outputs the name data indicating a kind of character and the priority data indicating priority of the character to the data bus in accordance with the program, and outputs a port address to the address bus corresponding to the video data memory unit 16. The address decoder 24, receiving the port address, supplies the signal VRAMDT to a data gate 38 and an address changing circuit 40, and supplies the signal VRAMDTWR to the video data memory unit 16. The data gate 38, receiving the signal VRAMDT, outputs the data transmitted from the CPU 10 to the data bus at that time to the video data memory unit 16. Receiving the signal VRAMDT from the address decoder and the signal BGEN from the timing signal generator 30 (FIG. 2), the address changing circuit 40 applies a content of the address latch 36 to the video data memory unit (VRAM) 16. In response to the signal VRAMDTWR, the video data memory unit 16 writes the name data and the priority data (FIG. 4) from the CPU 10 into the address outputted from the address changing circuit 40. Thus, at the initialized state or during the V blanking period, the background pattern data shown in FIG. 4 are written from the CPU 10 into the video data memory unit 16.

From the video data memory unit 16, the background pattern data shown in FIG. 4 are read during a horizontal scanning period. More specifically, a VRAM address arithmetic circuit 42 calculates an address value of the background pattern area 16a in the video data memory unit 16 corresponding to a position of a scanning line on the screen of the monitor 20 (FIG. 1) based on the H position data and the V position data from the timing signal generator 30, and supplies the address value to the address changing circuit 40. The address changing circuit 40 receives the signals ADSW and BGEN from the timing signal generator 30, and outputs the address value from the VRDM address arithmetic circuit 42 to the video data memory unit 16. When the address value is applied, the background pattern data shown in FIG. 4 are outputted from the video data memory unit 16. The name data included in the background pattern data is latched to the name register 44 in response to the signal NDR from the timing signal generator 30. The priority data is latched to the priority data register 46 in response to the signal PDR from the timing signal generator 30.

A character data address arithmetic circuit 48 calculates an address value of the character data area 16b in the video data memory unit 16 corresponding to a position of a scanning line on the screen based on the character code, i.e., the name data latched in the name register 44 and the V position data applied from the timing signal generator 30, and outputs an address value to the address changing circuit 40. The address changing circuit 40 applies the address value from the character data address arithmetic circuit 48 to the video data memory unit 16 in response to the signals ADSW and BGEN from the timing signal generator 30. Accordingly, from the video data memory unit 16, graphic data (dot data) constituting the character expressed by the name data is outputted. The dot data is latched to a dot data register 50 in response to the signal NDR from the timing signal generator 30. When data of a plurality of bits per one dot is necessary, reading of the video data memory unit 16 by the previous character data address arithmetic circuit 48 is repeated by the number corresponding to the bit number, and the dot data corresponding to each bit is latched to the dot data register 50. Furthermore, when a plurality of background picture cells are displayed, reading of the above-mentioned name data and the priority data and reading of the dot data are repeated by the number corresponding to the number of the background picture (still picture) cells, and the priority data and the dot data corresponding to respective still picture cells are latched to the priority data register 46 and the dot data register 50.

The dot data of the background picture characters thus latched to the dot data register 50 is latched by the P/S converter 52 in response to the signal PSLOAD from the timing signal generator 30. At the same time, the priority data stored in the priority data register 46 are latched by the priority data latch 54. The P/S converter 52 and the priority data latch 54 are prepared respectively by the number corresponding to the number of the background picture cells, and the dot data and the priority data of respective background picture cells are latched simultaneously to the P/S converter 52 and the priority data latch 54. In addition, in this embodiment, at most four background picture cells can be displayed, and it is determined by the signal M0–M3 from the mode decoder 28 (FIG. 1) which background picture cell(s) should be used.

The P/S converter 52 converts previously latched dot data into video data of one dot unit in response to the signal PSSHFT from the timing signal generator 30. At the same time, the priority data latch 54 outputs the priority data to a composite circuit 76 (FIG. 1) described later.

Figure 6:
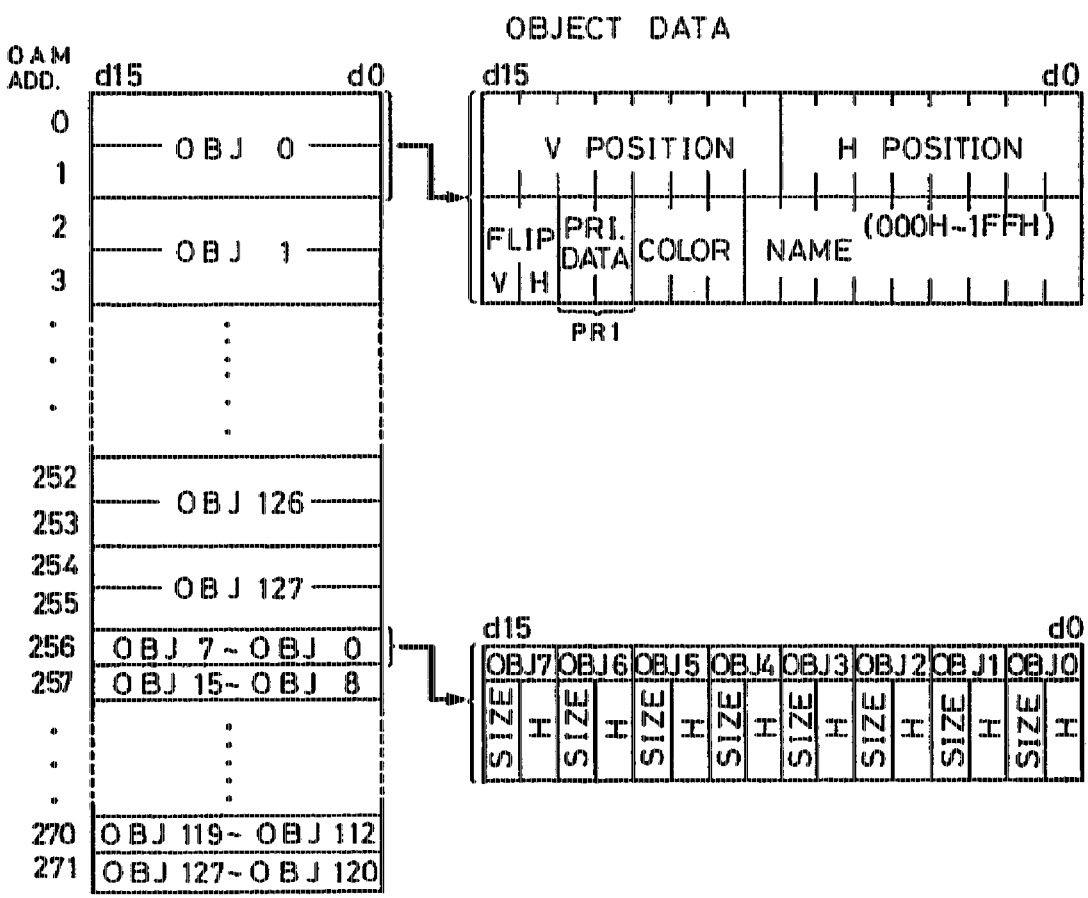
FIG. 6 is an illustrative view showing an example of a data format of object data (attribute data)
Figure 5:
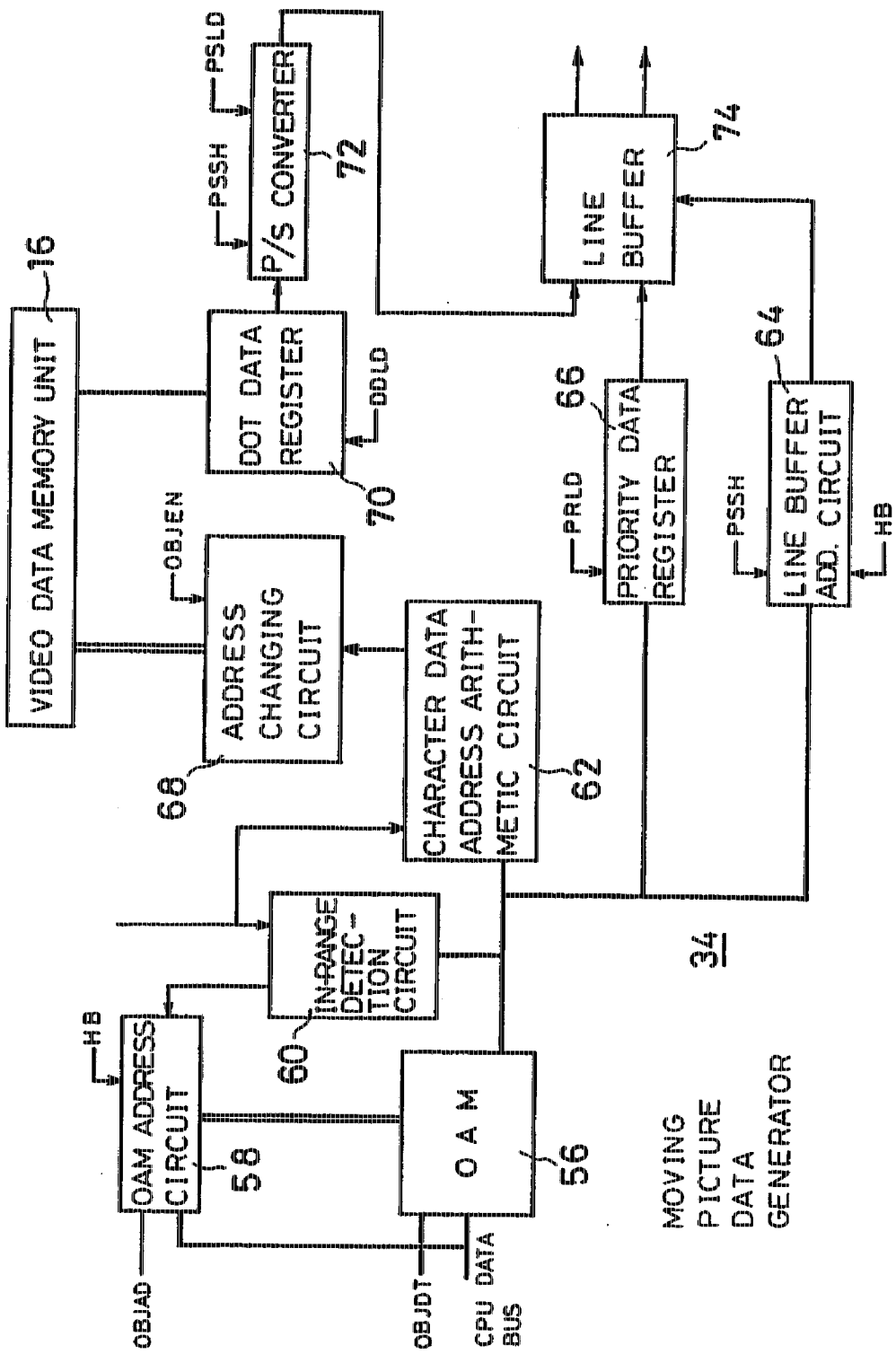
FIG. 5 is a block diagram showing a moving picture data generator of the embodiment in FIG. 1.

The moving picture data generator 34 shown in FIG. 1 will be shown in FIG. 5 in detail. The moving picture data generator 34 shown in FIG. 5 includes an OAM (Object Attribute Memory) 56, which has storage capacity of 34 bits×128, for example, and can store object data (attribute data) of a objects of total 128 pieces. The object data as shown in FIG. 6 is composed of total 34 bits, and includes object designating data (name data) of nine(9) bits, V position data of eight(8) bits, H position data of nine(9) bits, color data of three(3) bits, priority data of two(2) bits, flip data of two(2) bits and object size selecting data of one(1) bit. Such object data is also written from the program data memory unit 14 into the OAM 56 by the CPU 10 through the moving picture data generator 34. In addition, an address of the OAM 56 is designated by an OAM address circuit 58.

More specifically, at an initialized state or during the V blanking period, the CPU 10 (FIG. 1) outputs an OAM address value to the data bus in accordance with the program incorporated in the program data memory unit 14 (FIG. 1), and outputs a port address corresponding to the OAM address circuit 58 into the address bus. The address decoder 24 (FIG. 1), receiving the port address, outputs a latch signal OBJAD to the OAM address circuit 58. The OAM address circuit 58 latches the address value of the OAM 56 outputted from the CPU 10 at that time in response to the signal OBJAD. Thereafter, the CPU 10 outputs the object data indicating a kind and position of the moving picture (object) and the priority data indicating the priority of the object to the data bus, and outputs a port address corresponding to the OAM 56 into the address bus. Consequently, the signal OBJDT is outputted from the address decoder 24, and in response to the signal OBJDT, the object data and the priority data (attribute data) from the CPU 10 are written into an address designated by the OAM address circuit 58 of the OAM 56.

The OAM address circuit 58 receives the signal HB from the timing signal generator 30 and becomes an in-range detection mode and, in the in-range detection mode, the OAM address circuit 58 sequentially applies addresses from "0" to "maximum object number minus 1" to the OAM 56. The OAM 56 receives the addresses in sequence from the OAM address circuit 58, and applies the V position data and the H position data included in the object data (FIG. 6) to an in-range detection circuit 60. In the in-range detection circuit 60, based on the V position data from the timing signal generator 30, determination is effected as to whether or not the object is an object to be displayed in a next scanning line. Regarding only the object to be displayed, the in-range detection signal is applied to the OAM address circuit 58. The OAM address circuit 58, receiving the in-range detection signal from the in-range detection circuit 60, writes addresses of the OAM 56 storing the object data at the in-range state into an internal memory (not shown).

At the V blanking period, the OAM address circuit 58 becomes a buffer write mode in response to the signal HB from the timing signal generator 30. In this mode, addresses of the object data of the objects decided being at the in-range state by the in-range detection circuit 60 are applied in sequence to the OAM 56. On receiving the address from the OAM address circuit 58, the OAM 56 outputs the name data and the position data among the object data as shown in FIG. 6 to a character data address arithmetic circuit 62, and applies the position data to a line buffer address circuit 64 and also applies the priority data to a priority data register 66. The priority data register 66, receiving a signal PRLD from the timing signal generator 30, latches the priority data. The character data address arithmetic circuit 62 calculates an address value of the character data area 16b in the video data memory unit 16 (FIG. 1) based on the name data and the position data of the object as well as the V position data from the timing signal generator 30. The address value is applied to an address changing circuit 68. The address changing circuit 68 supplies the address value outputted from the character data address arithmetic circuit 62 to the character data area 16b in response to the signal OBJEN from the timing signal generator 30.

Consequently, from the character data area 16b, graphic data (dot data) of the character are outputted and applied to a dot data register 70. The dot data register 70 latches the dot data of the object outputted from the character data area 16b in response to the signal DDLD from the timing signal generator 30. A P/S converter 72 loads the dot data of the dot data register 70 in response to the signal PSLD from the timing signal generator 30.

The line buffer address circuit 64 is set to a line buffer write mode in response to the signal HB from the timing signal generator 30. In this mode, the line buffer address circuit 64 calculates an address value of the line buffer 74 based on the position data included in the object data inputted from the OAM 56. The line buffer 74, receiving the address from the line buffer address circuit 64, stores the dot data from the P/S converter 72 and the priority data from the priority data register 66.

After the line buffer 74 stores the dot data of one dot, the P/S converter 72 shifts the dot data in response to the signal PSSH from the timing signal generator 30, and applies the picture data in one dot unit to the line buffer 74. Also the line buffer address circuit 64 increments the address value in synchronization with data shifting in the P/S converter 72.

At the horizontal scanning period, the line buffer address circuit 64 is set to a line buffer read mode in response to the signal HB from the timing signal generator 30. In this mode, the line buffer address circuit 64 sequentially supplies the address values from "0" to "maximum dot number in horizontal direction minus 1" to the line buffer 74. Accordingly, from the line buffer 74, the object dot data and the priority data are outputted in sequence to be applied to a subsequent composite circuit 76 (FIG. 1).

Thus, the dot data and the priority data per each character of the background picture are outputted from the background picture data generator 32, and the dot data and the priority data of the object character are outputted from the moving picture data generator 34. These data are applied to the composite circuit 76 shown in FIG. 1. That is, respective dot data are applied to a transparency detecting circuit 78 and a picture data selecting circuit 80, and the priority data are applied to a picture data control circuit 82. The signals M0–M3 and BG3TOP from the CPU interface are supplied to the picture data control circuit 82.

Figure 7:
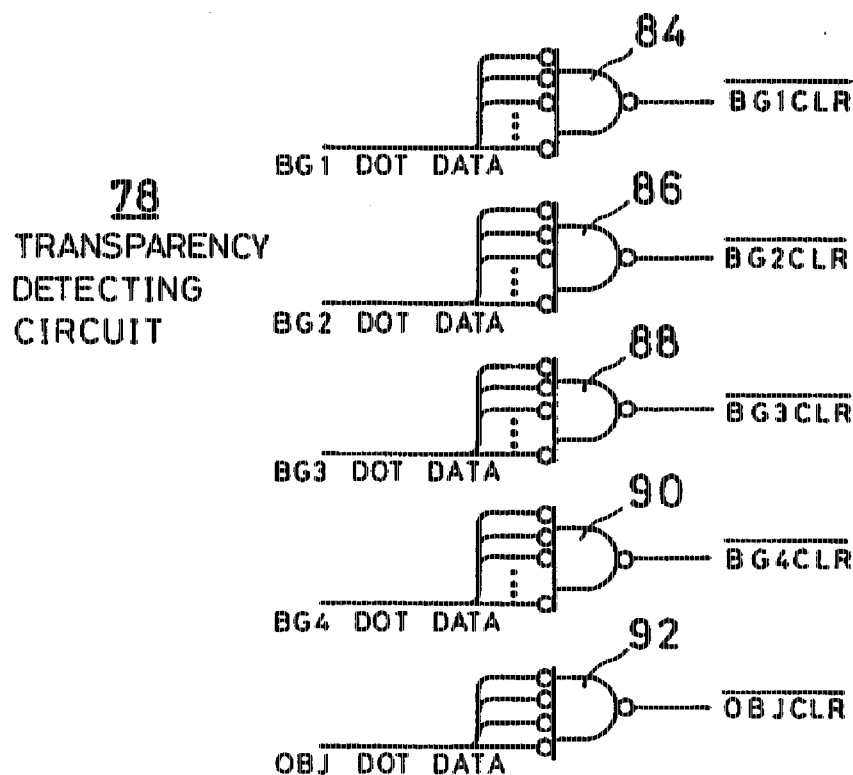
FIG. 7 is a circuit diagram of a transparency detecting circuit included in a composite circuit of the embodiment in FIG. 1.

The transparency detecting circuit 78 includes five OR gates 84, 86, 88, 90 and 92 as shown in FIG. 7. Inverted dot data of a first background picture cell BG1 from the P/S converter 52 (FIG. 3) of the background picture data generator 32 are inputted to the OR gate 84, inverted dot data of a second background picture cell BG2 are inputted to the OR gate 86, inverted dot data of the third background picture cell BG3 are inputted to the OR gate 88, and inverted dot data of a fourth background picture cell BG4 are inputted to the OR gate 90. The dot data of these background picture cells BG1–BG4 are 2–8 bits. On the other hand, inverted dot data of the object being four(4) bits are applied to the OR gate 92. From the OR gates 84, 86, 88, 90 and 92, when any of each input is "0", decision is effected that each character is transparent, and signals /BG1CLR, /BG2CLR, /BG3CLR, BG4CLR and /OBJCLR to make the priority data ineffective are outputted to be supplied to the picture data control circuit 82 (FIG. 1 and FIG. 8).

Figure 8:
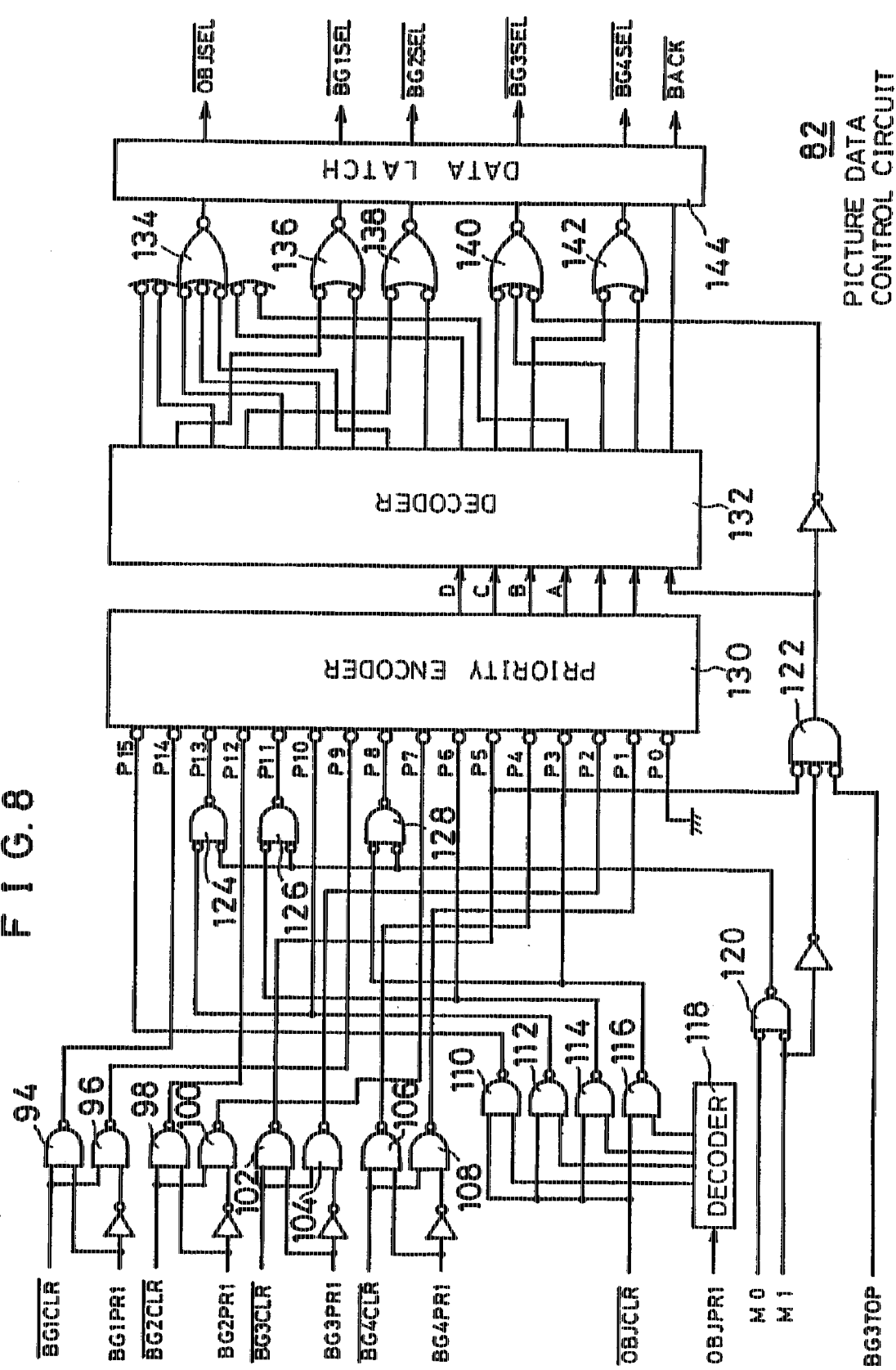
FIG. 8 is a block diagram showing a picture data control circuit included in the composite circuit of the embodiment in FIG. 1.

The signal /BG1CLR from the transparency detecting circuit 78 is supplied to respective one input of each of NAND gates 94 and 96 of the picture data control circuit 82 shown in FIG. 8. Priority data BG1PRI and its inversion of the first background picture cell are applied to respective other inputs of the NAND gates 94 and 96. Also the signal /BG2CLR from the transparency detecting circuit 78 is inputted to one input of each of NAND gates 98 and 100, and the priority data BG2PRI and its inversion of the second background picture cell are applied to other inputs of the NAND gates 98 and 100. The signal /BG3CLR from the transparency detecting circuit 78 is supplied to one input of each of NAND gates 102 and 104, and the priority data BG3PRI and its inversion of the third background picture cell are applied to other inputs of the NAND gates 102 and 104. The signal /BG4CLR is supplied to one input of each of NAND gates 106 and 108, and the priority data BG4PRI and its inversion of the fourth background picture cell are applied to other inputs of the NAND gates 106 and 108. Furthermore, the signal /OBJCLR from the transparency detecting circuit is supplied to respective one input of each of four NAND gates 110, 112, 114 and 116. Priority data OBJPRI (two bits) included in the object data are applied to a decoder 118. The decoder 118 decodes the priority data OBJPRI of two(2) bits and outputs signals indicating the four states, and the signals are supplied to other inputs of the NAND gates 110, 112, 114 and 116, respectively.

Inverted signals of the signals M0 and M1 from the mode decoder 28 (FIG. 1) are supplied to two inputs of a OR gate 120, and the signal M1 is supplied to one input of an OR gate 122. Inversion of the signal BG3TOP is supplied to one input of the OR gate 122, and inversion of output of the NAND gate 102 is further supplied to one input of the OR gate 122. Respective inverted outputs of NAND gates 112, 114 and 116 are supplied to respective one inputs of OR gates 124, 126 and 128, and inverted output of the OR gate 120 is supplied to respective other inputs of these OR gates 124–128.

A priority encoder 130 selects one having the highest priority among pictures where priority data are effective, and applies its number to a subsequent decoder 132. The priority encoder 130 has 16 inputs P0–P15. The input P0 is grounded. The inputs P1, P2, P3, P4, P5, P6, P7, P8, P9, P10, P11, P12, P13, P14 and P15 are supplied with outputs of the NAND gates 108, 104, 116, 106, 102, 114 and 100, the OR gate 128, the NAND gates 96 and 112, the OR gate 126, the NAND gate 98, the OR gates 124 and the NAND gates 94 and 110, respectively.

Thus, respective priority data are decoded by respective NAND gates and become a plurality of picture output signals, but only one picture output signal shown by the priority data is effective. Since the priority data exist per each screen (still picture cell and object), effective picture output signals exist by the screen number. On the other hand, all the picture output signals of the screen having the transparent picture data are made ineffective by the clear signals from the transparent detecting circuit 78, and only the picture output signals of the screen having the dot data being not transparent are made effective. Respective picture output signals are inputted to NAND gates together with the mode signals, and are further made effective or ineffective by values of the mode signals M0 and M1 to be inputted to the priority encoder 130. Consequently, signals being made effective by the priority encoder 130 are (a) the priority data of the background picture and the moving picture in the number set by the mode at that time, (b) the picture output signals generated respectively by selecting only one screen position among a plurality of picture positions peculiar to each screen (cell) by value of the priority data, (c) the picture output signals of the screen where the picture data are not transparent, and (d) the picture output signals made effective by setting the basic priority by the mode data. Thus, the priority encoder 130 selects one having the highest priority among the effective picture output signals.

Signals outputted from the priority encoder 130 are supplied to the decoder 132 which decodes the number from the priority encoder, and only one picture output signal shown by the number is made effective among all picture output signals. Only one picture output signals being made effective is latched to a data latch 144 by AND gates 134–140 as a dot data output selection signal that shows which dot data should be outputted. Consequently, from the data latch 144, dot data output selection signals /OBJSEL, /BG1SEL, /BG2SEL, /BG3SEL and /BG4SEL are outputted.

Since the priority data input terminal P0 of the priority encoder 130 is always supplied with an output signal of the background color data, when all the picture output signals are made ineffective, the background color data selection signal /BACK is outputted. The selection signal is supplied to the picture data selecting circuit 80 (FIG. 1 and FIG. 9).

Figure 9:
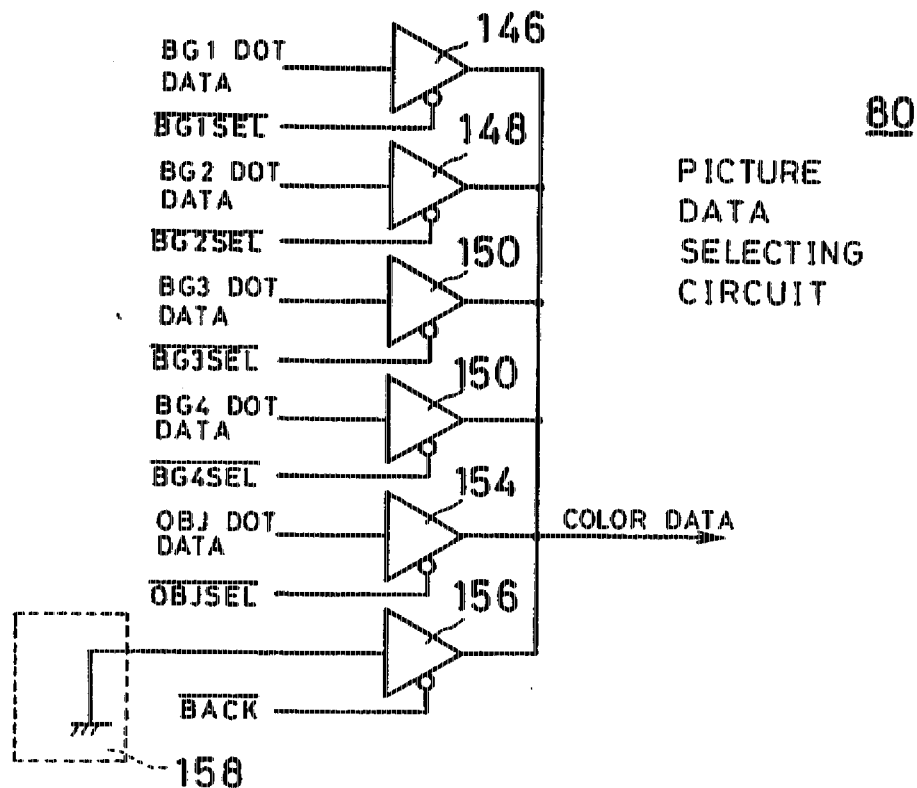
FIG. 9 is a circuit diagram showing a picture data selecting circuit included in the composite circuit of the embodiment in FIG. 1.

The picture data selecting circuit 80 with its detail shown in FIG. 9 includes six tri-state buffers 146–156 and further has a background color data generator 158. BG1 dot data from the background picture data generator 32 is inputted to the tri-state buffer 146, and the signal /BG1SEL from the picture data control circuit 82 is applied as its control input. Also the tri-state buffers 148, 150, 152 and 154 are respectively supplied with BG2 dot data and the signal /BG2SEL, BG3 dot data and the signal /BG3SEL, BG4 dot data and the signal /BG4SEL as well as OBJ dot data and the signal /OBJSEL. The tri-state buffer 156 is supplied with an output from the background color data generator 158, and its control input is supplied with the background color selection signal /BACK. Consequently, the picture data selecting circuit 80 selects the dot data corresponding to only one picture output signal made effective by the picture data control signal 82 or the background color data, and supplies the selected data as color data to a subsequent video signal generator 160.

Figure 10:
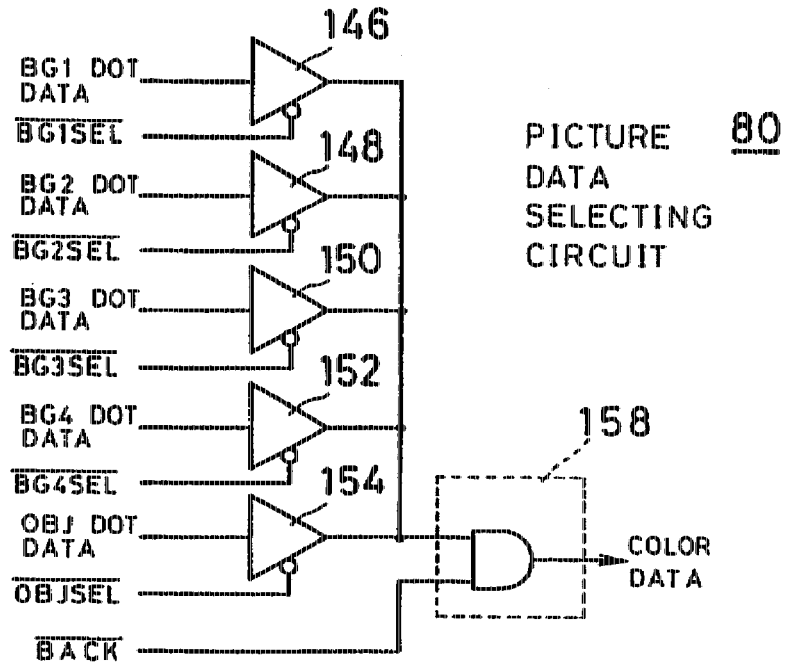
FIG. 10 is a circuit diagram showing a modification of the embodiment in FIG. 9.

In addition, the picture data selecting circuit 80 may be modified as shown in FIG. 10. In FIG. 10, an output of each of the tri-state buffers 146–154 and the background color selection signal /BACK are supplied to an AND gate of the background data generator 158. Consequently, only when the background color selection signal /BACK is at a low level, dot data outputted from any of the tri-state buffers 146–154 are selected.

Thus, the color data outputted from the picture data selecting circuit 80 are supplied to the video signal generator 160 shown in FIG. 1. The video signal generator 160 includes a color RAM 162 and a D/A converter 164. The color RAM 162 is a color table to derive color data using the dot data as address, and the color table is first written by the CPU 10. Consequently, a color signal selected in accordance with the color data from the picture data selecting circuit 80 is supplied to the D/A converter, and the color data is converted into a voltage level to be supplied to the TV interface 18.

Thus, the priority is applied per each character, and based on this, the priority is determined so that the picture data having the highest priority per each character unit is displayed on the monitor 20 (FIG. 1). This will be described in detail referring to FIGS. 11A–11D.

Figure 11A:
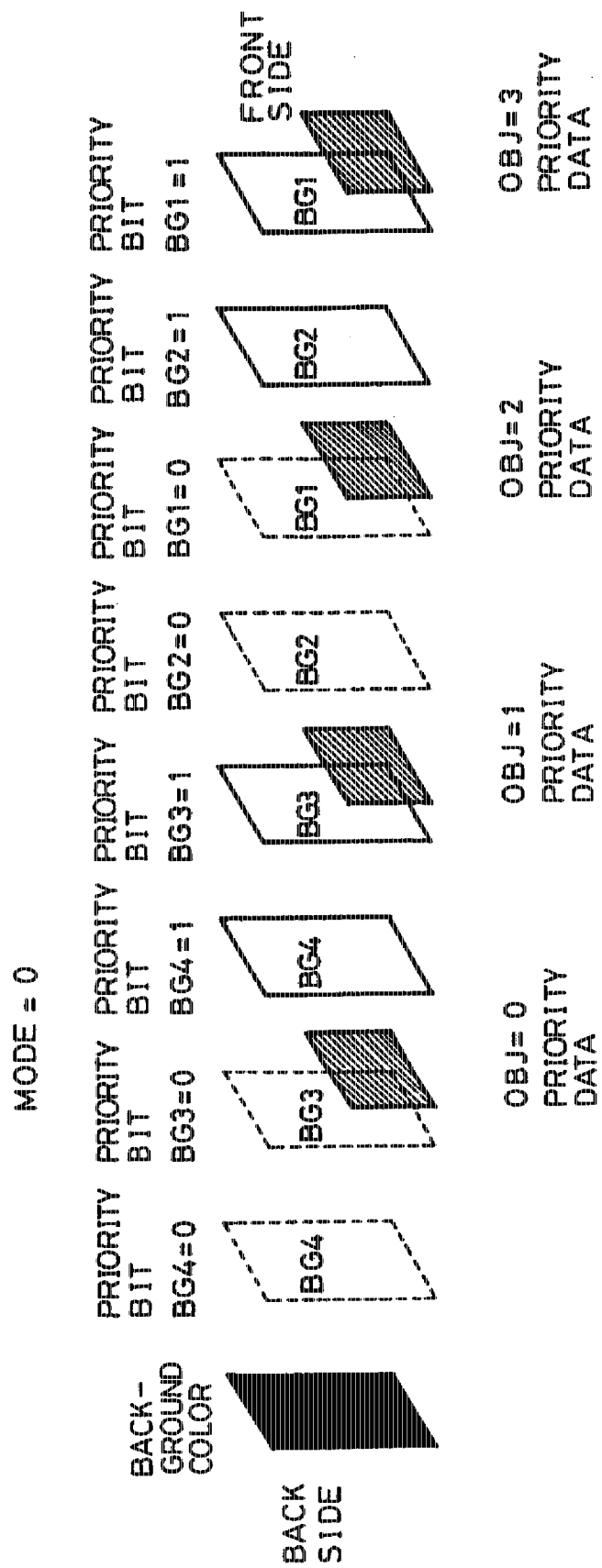

FIG. 11A shows a case of mode 0 specified by the signal M0 from the mode decoder 28 (FIG. 1). In this case, the first, second, third and fourth background picture cells BG1, BG2, BG3 and BG4 are all used.

When the priority data PRI of the background pattern data (FIG. 3) of each background picture cell are all set to "0" in the characters of the background picture cells expressed by the name codes, as shown by a dotted line in FIG. 11A, the background picture cells BG1, BG2, BG3 and BG4 are displayed from the front side of the monitor screen towards the back side in this order, and the background color is displayed at the most back side of the monitor screen by the background color data prepared in FIG. 9 or FIG. 10.

When the priority data of the characters of the second background picture cell BG2 is set to "1" and the priority data of other background picture cells BG1 BG3 and BG4 are set to "0", the characters of the second background picture cell BG2 is displayed at the front side of the monitor screen with respect to the first background picture cell BG1 as shown by a solid line in FIG. 11A. That is, in this case, the character of the second background picture cell BG2 is displayed with priority.

Also when the priority data of the characters of the fourth background picture cell BG4 are only set to "1", the character of the fourth background picture cell BG4 are displayed at the front side with respect to the characters of the third background picture cell BG3 as shown by a solid line in FIG. 11A.

In the mode 0, the signal /BG3TOP to display the third background picture cell BG3 at the nearest side of the monitor screen is ineffective.

Regarding the object, when the priority data PRI included in the object data (attribute data) shown in FIG. 6 is set to "11", irrespective of the priority data of the background pattern data, the object character is displayed at the front side of the monitor screen with respect to all background picture cells. When the priority data of the object data is set to "10", the object is displayed at the nearest side of the monitor screen if the priority data of any of the first background picture cell BG1 and the second background picture cell BG2 are set to "0". When the priority data included in the object data is set to "01", the object is displayed at the rear side with respect to the second background picture cell BG2 having the priority data being set to "0". When the priority data included in the object data is set to "00", the object is displayed at the front side with respect to the characters of the third background picture cell BG3 if the priority data of the third background picture cell BG3 are set to "0".

The mode 1 shown in FIG. 11B is specified by the signal M1 from the mode decoder 28 (FIG. 1). In this case, the fourth background picture cell BG4 is not used although it is used in FIG. 11A, and the signal BG3TOP to display the third background picture cell at the nearest side of the monitor screen is made effective. Consequently, when the signal BG3TOP is set from the CPU 10 to the mode register 26 (FIG. 1), the third background picture cell BG3 is displayed at the nearest side of the monitor screen as shown by a solid line in FIG. 11B. However, when the signal BG3TOP is set to "0", the character of the third background picture cell BG3 is displayed at the most back side of the monitor screen, irrespective of the priority data PRI.

The third background cell BG3 is set, for example, as the screen with little color number such as numeric characters.

When the signal BG3TOP to display the third background picture cell BG3 at the nearest side is set, the third background picture cell as a whole is displayed at the nearest side.

When the priority data PRI (FIG. 4) of the background pattern data of any of the first, second and third background picture cells is set to "0" and the signal BG3TOP is set to "0", as shown in FIG. 11B, the first, second and third background picture cells BG1, BG2 and BG3 are displayed from the front side of the monitor screen in this order. If the priority data of the second background picture cell is set to "1", in similar manner to FIG. 11A, the character of the second background picture cell BG2 is displayed at the front side with respect to the first background picture cell BG1. The object is as described in FIG. 11A.

Figure 11C:
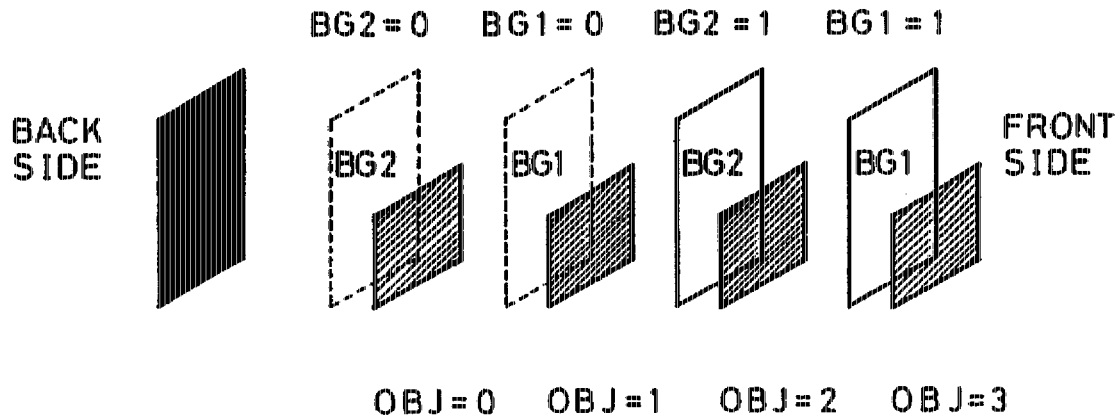

Referring to FIG. 11C, the mode 2 is specified by the signal M2 from the mode register 28 (FIG. 1), and only the first and second background picture cells BG1 and BG2 are used. Consequently, in the mode 2, the third and fourth background picture cells BG3 and BG4 as well as the signal BG3TOP are ineffective. When the priority data of any of the first and second background picture cells BG1 and BG2 is set to "0", as shown in FIG. 11C, the characters of the the first background picture cell BG1 and the second background picture cell BG2 are displayed from the front side of the monitor screen in this order. When the priority data of the second background picture cell BG2 is set to "1", the character of the second background picture cell BG2 is displayed at the front side with respect to the first background picture cell BG1.

Regarding the object, when the priority data included in the object data is "11", the object is displayed at the front side with respect to the character of the first background picture cell BG1 having the priority data being "1". When the priority data of the object data is set to "10", the object is displayed at the back side with respect to the character of the first background picture cell BG1 having the priority data being "1" and at the front side with respect to the character of the second background picture cell BG2 having the priority data being set to "1". When the priority data of the object data is set to "01", the object is set between the second background cell BG2 having the priority data being "1" and the first background cell BG1 having the priority data being "0". When the priority data of the object data is set to "00", the object is displayed between the first and second background picture cells BG1 and BG2, both having the priority data being set to "0".

Figure 11D:
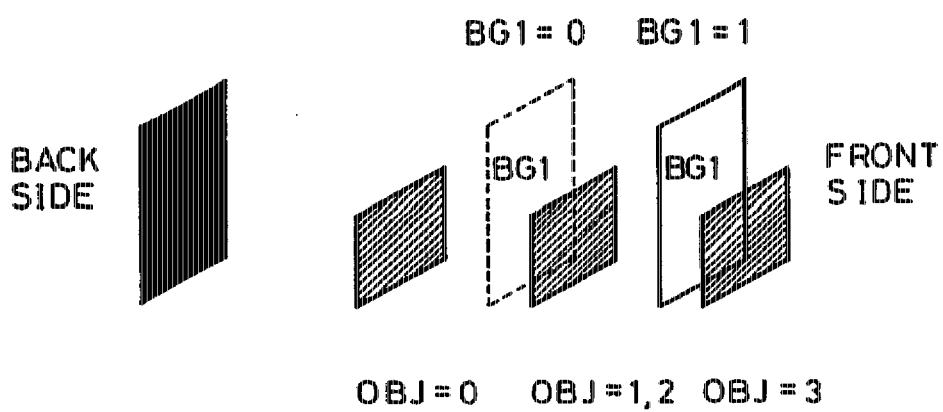

The mode 3 shown in FIG. 11D is specified by the signal M3 from the mode register 28 (FIG. 1), and only the first background picture cell BG1 is used in the mode 3. Consequently, the second–fourth background picture cells BG2–BG4 as well as the signal BG3TOP are ineffective. In the mode 3, when the priority data of the object data is set to "11", the object is displayed at the front side with respect to the first background picture cell BG1 having the priority data being set to "1". However, when the priority data of the object data is set to "10" or "01", the object is displayed at the back side with respect to the characters of the first background picture cell BG1 having the priority data being set to "1". However, when the priority data of the first background picture cell BG1 is set to "0", the object having the priority data being set to "10" or "01" is displayed at the front side. The object having the priority data being set to "00" is displayed at the most back side of the monitor screen.

In addition, a memory cartridge incorporating a semiconductor memory is used as an external storage unit in the above described embodiments; however, it is possible to use an external storage unit such as a CD-ROM in the present invention. In a case of use of the memory cartridge, the program data including the character data, color data, priority data, mode data and etc. that are described previously is stored in the semiconductor memory, and the CPU 10 generates control data for the moving picture characters and the still (background) picture characters on the basis of the program data read from the semiconductor memory and outputs the same to the video processor 12.

In contrast, in a case of use of the CD-ROM, the above described program data is optically recorded as digital data in the CD-ROM (not shown). In addition, an optical reader for optically reading recorded date on the CD-ROM is connected to a suitable connector such as a expansion connector. When the CD-ROM is used as the external storage unit, a memory cartridge is also used. In this case, the memory cartridge is comprised of a ROM (not shown) that stores a starting program for controlling an operation of the optical reader, a buffer RAM (not shown) for temporarily storing the program data read from the CD-ROM, and etc. Then, prior to a start of a display operation, the CPU 10 applies control data to the optical reader on the basis of the starting program of the ROM to cause the optical reader to read the recorded data of the CD-ROM. A portion of the character data read from the CD-ROM is transferred to the character RAM and the program data is transferred to the buffer RAM included in the memory cartridge. The CPU 10 controls the video processor 12 on the basis of the program data stored in the buffer RAM. That is, after the data read from the CD-ROM by the optical reader has been transferred to the respective memories, the CPU 10 and the video processor 12 execute the display operation by accessing the respective memories as done in the previous embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video display apparatus which displays a plurality of still picture cells each composed of a plurality of still picture characters in an overlaid state, said video display apparatus, comprising:

still picture video data generating means for generating video data of said still picture characters to be displayed regarding each of said plurality of still picture cells to which predetermined priorities are applied in advance;

first priority data applying means for separately applying first priority data for each still picture character generated by said still picture video data generating means, said first priority data being different from the data of the still picture character and designating a change of said predetermined priorities in displaying the still picture characters in the overlaid state;

selecting means for selecting at least two still picture cells on the basis of said predetermined priorities applied to said still picture cells, and at a time that said first priority data designates the change of said predetermined priorities, for selectively outputting the video data of the one still picture character having the highest priority among still picture characters of selected still picture cells on the basis of said predetermined priorities and said first priority data, thereby changing said predetermined priorities in an overlaid state of the plurality of still picture cells by each still picture character; and display means for displaying the still picture character outputted selectively by said selecting means.

2. A video display apparatus in accordance with claim 1, further comprising mode signal generating means for generating a mode signal to designate the number of the still picture cells to be displayed, said still picture video data generating means generating video data of the still picture character regarding the still picture cell designated by the mode signal, wherein said selecting means selects the video data of the still picture character of the still picture cell having the highest priority in that mode based on the predetermined priorities and the first priority data.

3. A video display apparatus in accordance with claim 1 further comprising transparency detecting means for detecting whether or not each still picture character is a transparent picture based on the video data outputted from said still picture video data generating means, wherein said selecting means determines the priority except for the video data of the still picture character detected as being transparent by said transparency detecting means.

4. A video display apparatus in accordance with claim 3, wherein said selecting means is provided with means for generating specific video data when it is detected by said transparency detecting means that all of said still picture characters are transparent.

5. A video display apparatus in accordance with claim 1, further comprising:

moving picture video data generating means for generating video data of a moving character; and second priority data applying means for applying second priority data to the video data of the moving picture character from said moving picture video data generating means, wherein said selecting means selectively outputs the video data of said one still picture character or the picture data of said moving picture character based on the first priority data and the second priority data.

6. A video display apparatus in accordance with claim 5, further comprising mode signal generating means for generating a mode signal to designate the number of the still picture cells to be displayed, said still picture video data generating means generating video data of the still picture character regarding the still picture cell designated by the mode signal, wherein said selecting means selects the video data of the still picture character of the still picture cell having the highest priority in that mode or the video data of the moving picture character based on the mode signal and the first priority data as well as the second priority data.

7. An external storage unit used in association with a video display apparatus which displays a plurality of still picture cells, each cell composed of a plurality of still picture characters, in an overlaid state on a monitor screen based on video data of still picture characters generated by a still picture video data generator, said external storage unit comprising:

still picture character code storing means for storing a still picture character code that designates a still picture character to be displayed, said still picture character video data generator generating the video data on the basis of still picture character codes pertaining to said plurality of still picture cells to which predetermined priorities are applied in advance; and first priority data storing means for storing and applying first priority data for each still picture character generated by said still picture video data generator, said first priority data being different from the data of the still picture character and designating a change of said predetermined priorities in displaying the still picture characters in the overlaid state, wherein said video display apparatus includes selecting means for selecting at least two still picture cells on the basis of said predetermined priorities applied to said still picture cells, and at a time that said first priority data designates the change of said predetermined priorities, for selectively outputting the video data of the one still picture character having the highest priority among still picture characters of selected still picture cells on the basis of said predetermined priorities and said first priority data, thereby changing said predetermined priorities in an overlaid state of the plurality of still picture cells with respect to each still picture character.

8. An external storage unit in accordance with claim 7, further comprising mode data storing means for storing mode data that designates the number of said still picture cells to be displayed, said still picture video data generator generating the video data of the still picture character regarding the still picture cell designated by said mode data, wherein said selecting means selects the video data of the still picture character of the still picture cell having the highest priority in that mode based on the predetermined priorities and the first priority data.

9. An external storage unit in accordance with claim 7, further comprising:

moving picture character code storing means for storing a moving picture character code that designates a moving picture character to be displayed; and second priority data storing means for storing second priority data that designates priority of the moving picture character, wherein said video display apparatus includes a moving picture Video data generator for generating video data of the moving character, and said selecting means selectively outputs the video data of said one still picture character or the video data of said moving picture character based on the first priority data and the second priority data.

10. A video display apparatus which displays a plurality of still picture cells each composed of a plurality of still picture characters in an overlaid state, said video display apparatus, comprising:

still picture logic circuits which produce video data of said still picture characters to be displayed regarding each of said plurality of still picture cells to which predetermined priorities are applied in advance;

first priority data logic circuits for separately producing and applying first priority data for each produced still picture character generated by said still picture logic circuits, said first priority data being different from the video data of the still picture character from said still picture logic circuits and [designates]designating a change of said predetermined priorities in displaying the still picture characters in the overlaid state;

a selection circuit for selecting at least two still picture cells on the basis of said predetermined priorities applied to said still picture cells, and at a time that said first priority data designates the change of said predetermined priorities, for selectively outputting the video data of the one still picture character having the highest priority among still picture characters of selected still picture cells on the basis of said predetermined priorities and said first priority data, thereby changing said predetermined priorities in an overlaid state of the plurality of still picture cells with respect to each still picture character; and a display device for displaying the still picture character outputted selectively by said selecting circuit.

11. A video display apparatus in accordance with claim 10, further comprising a mode signal generating device for generating a mode signal to designate the number of the still picture cells to be displayed, said still picture logic circuits producing video data of the still picture character regarding the still picture cells designated by the mode signal, wherein said selecting circuit selects the video data of the still picture character of the still picture cell having the highest priority in that mode based on the predetermined priorities and the first priority data.

12. A video display apparatus in accordance with claim 10, further comprising a transparency detecting circuit for detecting whether or not each still picture character is a transparent picture based on the video data outputted from said still picture logic circuits, wherein said selecting circuit determines the priorirty except for the video data of the still picture character detected as being transparent by said transparency detecting circuit.

13. A video display apparatus in accordance with claim 12, wherein said selecting circuit includes elements for generating specific video data when said transparency detecting circuit detects that all of said still picture characters are transparent.

14. A video display apparatus in accordance with claim 10, further comprising:

moving picture video data generating circuits for generating video data of a moving character; and second priority data logic circuits for producing and applying second priroity data to the video data of the moving picture character from said moving picture video data generating circuits, wherein said selecting circuit selectively outputs the video data of said one still picture character or the picture data of said moving picture character based on the first priority data and the second priority data.

15. A video display apparatus in accordance with claim 14, further comprising a mode signal generating device for generating a mode signal to designate the number of the still picture cells to be displayed, said still picture logic circuits producing video data of the still picture character regarding the still picture cells designated by the mode signal, wherein said selecting circuit selects the video data of the still picture character of the still picture cell having the highest priority in that mode or the video data of the moving picture character based on the mode signal and the first priority data as well as the second priority data.

16. An external storage unit used in association with a video display apparatus which displays a plurality of still picture cells, each cell composed of a plurality of stiff picture characters, in an overlaid state on a monitor screen based on video data of still picture characters generated by a still picture video data generator, said external storage unit comprising:

a still picture character code storage device for storing a still picture character code that designates a still picture character to be displayed, said still picture character video data generator generating the video data on the basis of still picture character codes pertaining to said plurality of still picture cells to which predetermined priorities are applied in advance; and a first priority data storing element for storing and applying first priority data for each still picture character generated by said still picture video data generator, said first priority data being different from the data of the still picture character and designating a change of said predetermined priorities in displaying the still picture characters in the overlaid state, said video display apparatus including selecting circuits for selecting at least two still picture cells on the basis of said predetermined priorities applied to said still picture cells, and at a time that said first priority data designates the change of said predetermined priorities, for selectively outputting the video data of the one still picture character having the highest priority among still picture characters of selected still picture cells on the basis of said predetermined priorities and said first priority data, thereby changing said predetermined priorities in an overlaid state of the plurality of still picture cells with respect to each still picture character.

17. An external storage unit in accordance with claim 16, further comprising a mode data storing device for storing mode data that designates the number of said still picture cells to be displayed, said still picture video data generator generating the video data of the still picture character regarding the still picture cells designated by said mode data, wherein said selecting circuit selects the video data of the still picture character of the still picture cell having the highest priority in that mode based on the predetermined priorities and the first priority data.

18. An external storage unit in accordance with claim 16, further comprising:

a moving picture character code storing device for storing a moving picture character code that designates a moving picture character to be displayed; and a second priority data storing element for storing second priority data that designates priority of the moving picture character, wherein said video display apparatus includes a moving picture video data generator for generating video data of the moving character, and said selecting circuit selectively outputs the video data of said one still picture character or the video data of said moving picture character based on the first priority data and the second priority data.

19. A video display apparatus for displaying a plurality of picture cells in an overlaid state, each cell including a plurality of picture characters, said video display apparatus comprising:

a still picture video data generator for producing video data of still picture characters to be displayed for each of said plurality of picture cells to which predetermined priorities are applied in advance;

a first storing element for storing and applying first priority data for each still picture character generated by said still picture video data generator for each of said plurality of picture cells, wherein the first priority data is distinct from the video data and designates a change of said predetermined priorities in displaying the still picture characters in the overlaid state;

a moving picture video generator for producing video data of a moving character;

a second storing element for storing and producing a second priority data associated with the moving character video data; and a control and selection circuit responsive to said predetermined priorities, the video data of moving and still picture characters and said first and second priority data for selectively outputting the video data of a still picture character having the highest priority of the still picture characters of the overlaid cells to be displayed or the moving picture character based on the first and second priority data.

20. A video display apparatus as in claim 19, said apparatus further comprising:

a transparency detecting circuit for detecting whether or not each still picture character of the overlaid picture cells is a transparent picture based on the video data produced by the still picture video data generator so that the video data selectively output by the control and selection circuit does not output the video data of a still picture character that has been determined to be transparent.

21. A video display apparatus as in claim 20, wherein the control and selection circuit includes circuitry for selectively outputting specific color video data in the absence of a moving character and the transparency detecting circuit detects that all of the overlaid still picture characters are transparent.

22. A video display apparatus which displays a plurality of still picture cells each composed of a plurality of still picture characters in an overlaid state, said video display apparatus, comprising:

still picture character storing means for storing video data of said plurality of still picture characters to be displayed regarding each of said plurality of still picture cells to which predetermined priorities are applied in advance;

still picture name data storing means for storing still picture name data for designating a position on a screen at which each of said plurality of still picture characters is to be displayed;

first priority data applying means for separately applying, by each still picture character, for each still picture character displayed at the position on the screen designated by said still picture name data first priority data which is different from the data of the still picture character and designates a change of said predetermined priorities in displaying the still picture characters in the overlaid state;

selecting means for selecting at least two still picture cells on the basis of said predetermined priorities applied to said picture cells, and at a time that said first priority data designates the change of said predetermined priorities, for selectively outputting the video data of the one still picture character having the highest priority among still picture characters of selected still picture cells on the basis of said predetermined priorities and said first priority data, thereby changing said predetermined priorities in an overlaid state of the plurality of still picture cells by each still picture character; and display means for displaying the still picture character outputted selectively by said selecting means.

* * * * *